(Model.)

J. T. HONEYCUTT.
VARIABLE VERNIER.

No. 342,097.  Patented May 18, 1886.

Witnesses.
David H. Mead
Curtis Lammond

Inventor.
J. T. Honeycutt
By Wm. D. McIntire
Atty.

UNITED STATES PATENT OFFICE.

JOHN T. HONEYCUTT, OF KEMPER COUNTY, MISSISSIPPI.

VARIABLE VERNIER.

SPECIFICATION forming part of Letters Patent No. 342,097, dated May 18, 1886.

Application filed July 27, 1885. Serial No. 172,837. (Model.)

*To all whom it may concern:*

Be it known that I, JOHN T. HONEYCUTT, a citizen of the United States, residing in Kemper county, Mississippi, have invented new and useful Improvements in Variable Verniers for Use with Scales of Equal Parts, of which the following is a specification.

My invention relates to variable verniers for use in connection with a scale of equal parts. With verniers as generally made tenths, twentieths, thirtieths, &c., of the least count of the scale may be read; but thirds, sevenths, ninths, &c., and other parts which cannot be expressed in tenths, hundredths, &c., cannot be read with the same vernier; and the object of the present invention is to produce a vernier by which it is possible to subdivide the least count or smallest division into parts represented by fractions with different denominators.

With this object in view my invention consists of a plane surface of any suitable material, provided with a number of equidistant parallel right lines, the common perpendicular distance between these lines being equal or nearly equal to one of the divisions or least count of the scale, these lines being numbered either from left to right or from right to left in the same manner as that in which the graduations of the scale are numbered, and a suitable scale so constructed as to be moved back and forth at pleasure upon the vernier.

Figure 1:
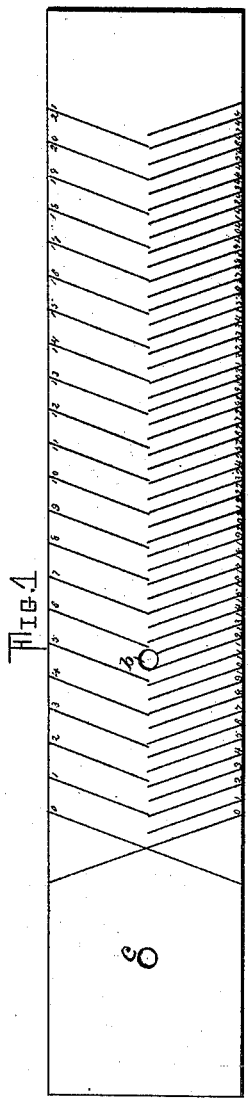
Figure 2:
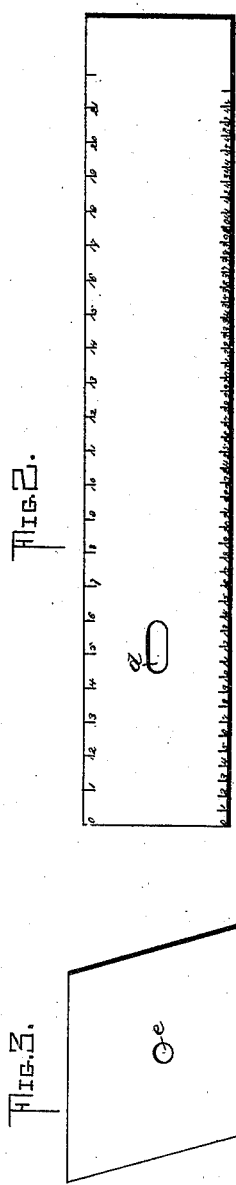
Figure 4:
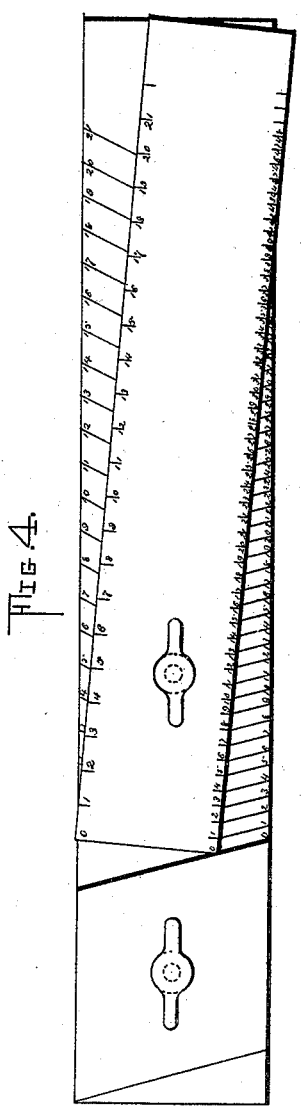
Figure 3:
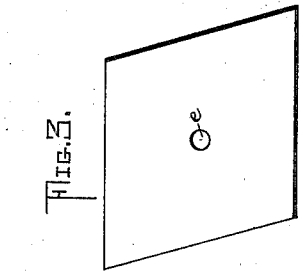
Figure 5:
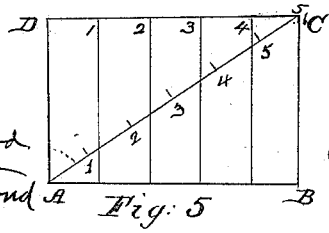

Figure 1 represents a board or slat bearing two vernier-scales. Fig. 2 represents a scale to be used in connection with the vernier shown in Fig. 1. Two of these verniers are represented in Fig. 1 of the accompanying drawings, both on the same vernier-plate, one being for a scale of five to the inch and one for a scale of centimeters. The two scales for use with these verniers—the two on one plate— are shown in Fig. 2. Fig. 3 represents a pivoted block which is arranged upon the vernier, and which, when properly adjusted against the end of the movable scale, serves to hold it in any given position and relation to the vernier. Fig. 4 is a plan view of the vernier-scale and holding-block properly assembled for use, and Fig. 5 is a plan or diagram, which will be hereinafter referred to for the purpose of explaining the use of the vernier and scale.

The following is the manner of using the vernier and scale: Place the scale on the vernier, as shown in Fig. 4, so that the 0 graduation of the scale is on the 0 line of the vernier, and, for example, the 31 graduation of the scale on the 30 line of the vernier, (the latter number in any particular case being one less than the former,) then, by the well-known mathematical principle of the vernier, the distance from the 1 graduation of the scale to the 1 line of the vernier measured along the scale is one-thirtieth of the unit (or smallest division) of the scale. The distance from 2 of the scale to the 2 line of the vernier is two-thirtieths of this unit, &c. In like manner by placing the 0 graduation of the scale on the 0 line of the vernier and the 30 graduation of the scale on the 29 line of the vernier we have the scale set to read to twenty-ninths of the unit, the distance from the 3 of the scale to the 3 line of the vernier being three twenty-ninths of the unit, &c.

The lines of the vernier should be inclined to the edge of the vernier-plate, as seen in Fig. 1. The advantage in having these lines thus inclined is that it is not then necessary to have the vernier-plate so wide as it would have to be were these lines perpendicular to the edge. Thus by giving the lines this inclination we obtain a saving of material and labor in making the vernier, and then have this vernier in a form more conveniently carried and manipulated than if the lines were perpendicular to the edge of the vernier-plate.

When the perpendicular distance between the lines of the vernier is equal to one of the divisions of the scale, a convenient angle of inclination may be found from the following considerations. Suppose there are five divisions on the vernier. Then when the scale is placed on the vernier-plate extending obliquely across the lines so that six divisions of the scale extend across five of the vernier the angle which the scale makes with these lines is that whose sine is five-sixths, as may be seen by reference to Fig. 5 of the drawings. In said figure the angle C A D is the inclination of the parallel lines to the scale, A C being the position of the scale. Hence, if these lines are given this inclination to the edge of the vernier-plate, this scale would be parallel to this edge when set to read to fifths of the unit. In the same manner if there are twenty-five divisions on the vernier and the lines be inclined to the edge at the angle whose sine is twenty-five twenty-sixths the scale would be parallel to the edge when set to read to twenty-fifths of the unit. In general, if $m$ denote the total number of divisions of the vernier and the lines be inclined to the edge of the vernier-plate at the angle whose sine is $\frac{m}{m+1}$ the scale will be parallel to the edge of the venier-plate when set to give the smallest fractional readings, or to read to fractions having $m$ for a denominator. The angle (found in this way) may be diminished, making the lines more inclined by a few degrees, depending on the width and length of the vernier-plate. This excess of inclination beyond that obtained in the manner explained causes the scale when set for the smaller fractions to be extended obliquely across the vernier in an opposite direction from that in which it is inclined when set for the larger fractions, and thus we utilize this inclination of the scale to the vernier-plate on both sides of the parallel position, and are thus enabled to have the vernier-plate narrower and yet give as many different fractional readings.

The distance between the lines of the vernier (perpendicular distance) may be equal to or differ slightly from the smallest division of the scale (which we will call the "unit" of the scale.) The smaller this distance is as compared with the unit of the scale the more will the scale have to be inclined to the vernier-lines when set for any particular reading, which would be objectionable, since one extremity of any distance is the intersection of a line of the vernier with the scale, (or edge of the ruler on which the scale is graduated,) and this intersection is more accurately shown when these two lines are more nearly at right angles to each other, and for this same reason it is best, in using the scale and vernier, to convert fractions with small denominators to equivalent ones with larger denominators. For example, three-sevenths should be converted to fifteen thirty-fifths, or to some other fraction having as large a denominator as the vernier enables us to read. This distance between the vernier-lines must not be greater than the unit of the scale increased by a part of the unit represented by a fraction whose numerator is 1 and whose denominator is the number of the divisions of the vernier. For example, if there are twenty-five divisions on the vernier, the vernier distance must not be greater than one twenty-fifth of the unit of the scale, for if it were greater then twenty-six divisions of the scale could not be made to extend over twenty-five divisions of the vernier, as it must do to read to twenty-fifths of the unit.

Following out the well-known principle of the vernier, it will obviously make no difference whether the divisions on the vernier are greater or less than those on the scale. Guided by these two considerations, any distance may be taken for the vernier distance. This makes the graduations more simple than in the ordinary vernier, where the vernier distance must be equal to the unit of the scale decreased or increased by a certain fractional part of this unit, depending on the number of divisions on the vernier. By taking the vernier distance the same as the unit of the scale the graduation of the vernier is very much simplified. This fact that the vernier distance may vary slightly from the unit of the scale, without loss of accuracy or convenience in using the vernier and scale, is important in that the vernier-plate may for this reason be of the same or of a different material from that on which the scale is made, materials differing in the effects of heat and cold in expanding and contracting them without loss of accuracy being caused by this difference of expansion or contraction, since it is only necessary that the vernier distance continue uniform, or that the vernier-lines continue equidistant and parallel. The vernier-plate may then be of any otherwise suitable material, while the scale for fine and accurate work should be on some material as little as possible affected by heat and cold.

The scale may be entirely detached from the vernier and applied to it by hand when we wish to get a distance with the scale and vernier, or there may be some convenient mechanical arrangement for attaching them and for setting and clamping them for any desired fractional readings.

The following is a method which I have devised for attaching, setting, and clamping, and in which are combined two verniers on the same plate for two scales with different units. Referring to Fig. 1 of the drawings, at a point, $b$, a hole is made, through which a clamp-screw is to pass, and a slot, as shown at $d$, Fig. 2, is cut, through which the screw also is to pass. When the screw is unclamped, the scale moves freely on the vernier, and may be set for any desired reading, and then the screw being clamped holds the scale in this position. To enable us easily to keep 0 of the scale on the 0 line of the vernier while setting the scale, the end of the scale is taken as the 0; or, in other words, the scale is graduated from the end of the plate on which it is made, and the edge of a block is made to coincide with the 0 line of the vernier. Thus the end of the scale being kept against the block, the 0 of the scale is on the 0 line of the vernier and all difficulty in making the coincidence at one extremity is eliminated. I have selected for the form of the block that shown in Fig. 3. It is to be clamped toward the end of the vernier-plate by a clamp-screw passing through the holes shown at $c$, Fig. 1, and $e$, Fig. 3. One edge of this block may be made to coincide with the 0 line of one vernier and clamped, and is to remain clamped in this position so long as we are to use this vernier. If we wish to use the other vernier and scale, the block is unclamped and revolved till another edge coincides with the 0 line of the other vernier, and then clamped in this position.

The scale for use with this vernier, as here described, must be graduated on the edges, as seen in Fig. 2 of the drawings; and when the arrangement for manipulating is that here given the corners which form the origins or zeroes of the scales should be formed of steel or some other hard metal to prevent wearing away. The edges of the block should in like manner be protected by a band or rim, if the block is not made of some hard material.

This vernier might be made on glass or some other transparent material, in which case it could be placed on or applied to the scale, instead of the scale being applied to the vernier in the manner described.

What I claim as my invention, and desire to secure by Letters Patent, is—

1. The combination, with a scale having equal divisions along its edge, of a vernier-plate having equidistant parallel lines on its surface, and capable of an angular motion with respect to the edge of the scale, so that the lines of the vernier may be made to assume different angles of inclination to the edge of the scale, and any desired number of divisions of the scale be made to extend over a one greater or one less number of divisions of the vernier-plate and form different vernier-scales, substantially as specified.

2. The combination, with a scale having equal divisions along its edge, of a vernier-plate having equal divisions along its edge, but differing in length from the divisions on the scale, and oblique parallel lines upon the surface of the vernier-plate extending inwardly from the divided edge, substantially as and for the purposes specified.

3. The combination, with a scale having parallel edges, and having different sets of equal divisions along its opposite edges, of a vernier-plate having parallel edges, and having different sets of equal divisions along its opposite edges and differing in lengths from the respective divisions on the scale, and oblique parallel lines upon the surface of the vernier-plate extending inwardly in opposite directions from the opposite divided edges, substantially as and for the purposes specified.

4. The combination, with a scale having parallel edges, and having different sets of equal divisions along its opposite edges, of a vernier-plate having parallel edges, and having different sets of equal divisions along its opposite edges and differing in lengths from the respective divisions on the scale, and oblique parallel lines upon the surface of the vernier-plate extending inwardly in opposite directions from the opposite divided edges, and a clamping device for holding the scale and vernier-plate together, substantially as and for the purposes specified.

In testimony whereof I have hereunto set my hand and seal in the presence of two subscribing witnesses.

J. T. HONEYCUTT. [L. S.]

Witnesses:
   JNO V. WHITE,
   FRANCK E. TAYLOR.